United States Patent
Nakamura

[11] Patent Number: 5,869,761
[45] Date of Patent: Feb. 9, 1999

[54] IMPACT SENSOR

[75] Inventor: Takeshi Nakamura, Nagaokakyo, Japan

[73] Assignee: Murata Manuafacturing Co., Ltd., Japan

[21] Appl. No.: 678,251

[22] Filed: Jul. 11, 1996

[30] Foreign Application Priority Data

Jul. 11, 1995 [JP] Japan .................................. 7-199098

[51] Int. Cl.⁶ .................................................. H01L 41/08
[52] U.S. Cl. ...................................... 73/514.34; 73/514.16
[58] Field of Search ................................ 73/12.01, 11.01, 73/514.01, 514.16, 514.21–514.24, 514.29, 514.31, 514.34–514.36, 514.38, 514.32

[56] References Cited

U.S. PATENT DOCUMENTS

| | | | |
|---|---|---|---|
| 4,315,433 | 2/1982 | Edelman et al. | 73/514.34 |
| 4,398,417 | 8/1983 | Shutt | 73/514.38 |
| 4,473,768 | 9/1984 | Kerr et al. | 73/514.24 |
| 4,586,377 | 5/1986 | Schmid | 73/514.34 |
| 5,253,527 | 10/1993 | Yamaguchi et al. | 73/514.24 |
| 5,425,750 | 6/1995 | Moberg | 73/514.36 |
| 5,528,937 | 6/1996 | Dufour | 73/514.32 |
| 5,594,171 | 1/1997 | Ishida et al. | 73/514.38 |

FOREIGN PATENT DOCUMENTS 1 569 725  6/1990  U.S.S.R. ............................ 73/514.34

*Primary Examiner*—Robert Raevis
*Attorney, Agent, or Firm*—Ostrolenk, Faber, Gerb & Soffen, LLP

[57] ABSTRACT

An impact sensor includes: a board; detecting means for detecting the deformation of said board; a connection member which extends from said board obliquely with respect to the surface of said board; and a weight mounted in the end portion of said connection member.

48 Claims, 4 Drawing Sheets

IMPACT SENSOR

BACKGROUND OF THE INVENTION

1. Field of the Invention

The present invention relates to an impact sensor and, more particularly, to an impact sensor for detecting, for example, the impact of a car accident.

2. Description of the Related Art

Various acceleration sensors or the like have been used as impact sensors. One use of such impact sensors is to unlock a car door when a car accident occurs, making it easier to save the persons trapped within the car.

However, conventional acceleration sensors have directivity, and can detect an impact in only one direction. For this reason, acceleration sensors must be disposed in the three intersecting axial directions, if impacts in all directions are to be detected. This is disadvantageous for several reasons, the impact sensor becomes enlarged, the manufacturing costs increase, and there is a directional aspect in mounting the impact sensor.

SUMMARY OF THE INVENTION

Accordingly, an object of the present invention is to provide a nondirectional impact sensor which is, with only a single sensor, capable of detecting impacts in all directions.

The present invention provides an impact sensor comprising: a generally planar board; a detector for detecting the deformation of the board; a connection member coupled to the board and having a weight mounted thereon, an imaginary line extending from the center of gravity of the weight to the point at which the connection member is coupled to the board being oblique with respect to the plane of the board.

In one embodiment of the invention, the sensor comprises a piezoelectric layer having electrodes formed on opposite sides. One of the electrodes is formed in such a way that its area on either side of an imaginary straight line passing through the point at which the connection member is coupled to the board is different.

In another embodiment of the invention, the detector is a ferroelectric thin film.

In a third embodiment of the invention, the board is formed of a piezoelectric material and the detector comprises the piezoelectric element and electrodes formed on opposite sides thereof. In this embodiment, one of the electrodes is preferably formed in such a way that its area is different on opposite sides of an imaginary straight line passing through the point where the connection member is coupled to the board.

When an impact is applied to the weight, regardless of the direction of the impact, a force is applied to the board via the connection member. At this time, since the connection member extends obliquely with respect to the plane of the board, the board is deformed around an imaginary line extending through the point wherein the connection member is mounted on the board, and a signal is output from the detector as a function of the deformation of the board. When a piezoelectric element is used as the detecting means, charges of opposite polarity are generated in the piezoelectric element on opposite sides of an imaginary line extending through the point at which the connection member is mounted on the board in proportion to the degree of deformation of the board. For this reason, if the electrode is formed in such a way that the area of the electrode is different on each side of the imaginary straight line, the charges detected by the respective sides of the electrode are not completely canceled, and a net charge is output. By measuring the voltage generated in the piezoelectric element, it is possible to detect the impact.

Further, if the piezoelectric element is excited beforehand, its resonance frequency and impedance vary according to the deformation of the board. Therefore, the measurement of the resonance frequency and impedance makes it possible to detect an impact. In order to measure the variation in the voltage and the resonance frequency, the board itself may be formed of a piezoelectric member with electrodes formed on opposite surfaces thereof. Further, when a ferroelectric thin film is used as a detector, its electrostatic capacity varies due to the deformation of the board. Therefore, by measuring the electrostatic capacity of the detector element, an impact can be detected.

According to the present invention, a nondirectional impact sensor can be obtained which is capable of detecting impacts in all directions. Furthermore, by connecting the mass to the board in such a manner that an imaginary line extending between the center of gravity of the mass and the point at which the connection member connects the mass to the board is oblique with respect to the plane of the board, it is possible to deform the board to substantially the same degree with respect to impacts in all directions. Thus, it is possible to obtain an impact sensor having a sensitivity which is substantially the same with respect to impacts in all directions.

The above and further objects, features, and advantages of the invention will become more apparent from the following detailed description of an embodiment made with reference to the accompanying drawings.

BRIEF DESCRIPTION OF THE DRAWINGS

For the purpose of illustrating the invention, there is shown in the drawings several forms which are presently preferred, it being understood, however, that the invention is not limited to the precise arrangements and instrumentalities shown.

DETAILED DESCRIPTION OF EMBODIMENTS OF THE INVENTION

Figure 1:
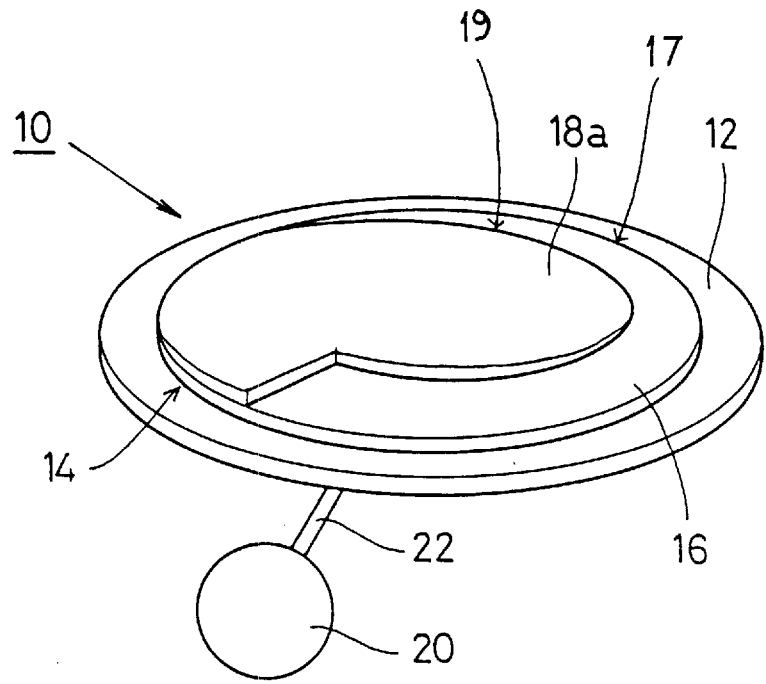
FIG. 1 is a perspective view illustrating an example of an impact sensor of the present invention.
Figure 2:
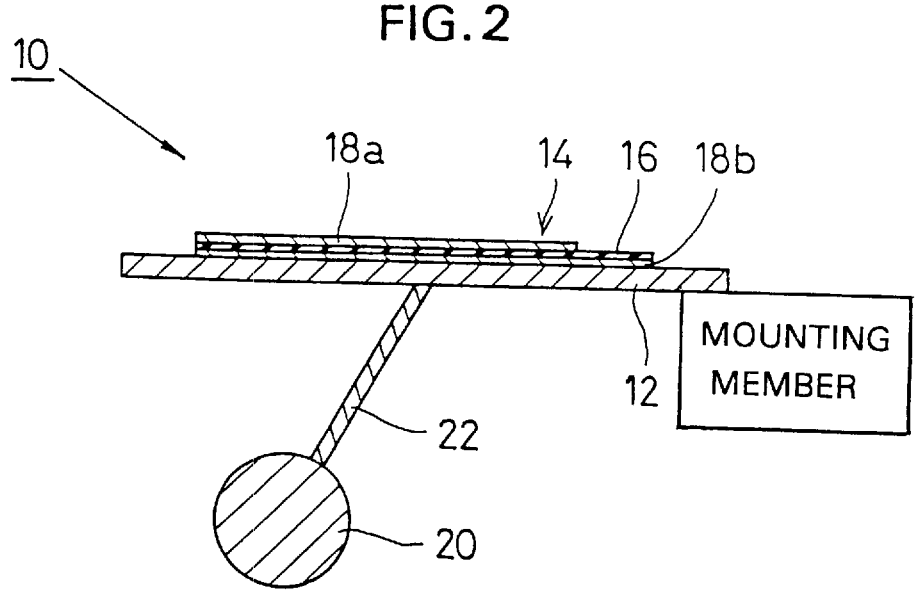
FIG. 2 is a sectional view of the impact sensor shown in FIG. 1.

Referring now to the drawings wherein like numerals indicate like elements, there is shown in FIGS. 1 and 2 an impact sensor constructed in accordance with the principles of the present invention and designated generally as 10.

Impact sensor 10 includes a board 12 formed of, for example, a thin metallic plate. A piezoelectric element 14, serving as detector, is formed on one side of the board 12. The piezoelectric element 14 includes a circular piezoelectric layer 16 having electrodes 18a and 18b (FIG. 2) formed on opposite surfaces thereof. The piezoelectric layer 16 may be formed, for example, of piezoelectric ceramic. The electrode 18b is preferably bonded to the board 12. The electrode 18a is formed such that its outer peripheral edge 19 separates from the outer peripheral edge of the piezoelectric layer 16 in one direction along the outer periphery of the piezoelectric layer 16.

A weight (mass) 20 is disposed on the opposite main face of the board 12. The weight 20 is preferably connected to the central portion of the board 12 by a connection member 22. The connection member 22 is preferably a straight member which is mounted to the board 12 in such a manner that it extends obliquely with respect to the plane of the board 12. The weight 20 is preferably mounted on the end portion of the connection member 22 with the result that an imaginary line extending from the center of gravity of the weight 20 to the point 15 wherein the connection member 22 is coupled to the board 12 is oblique to the plane of the board 12. The impact sensor 10 is preferably supported by a structure (not shown) coupled to the end portion of the board 12.

Figure 3:
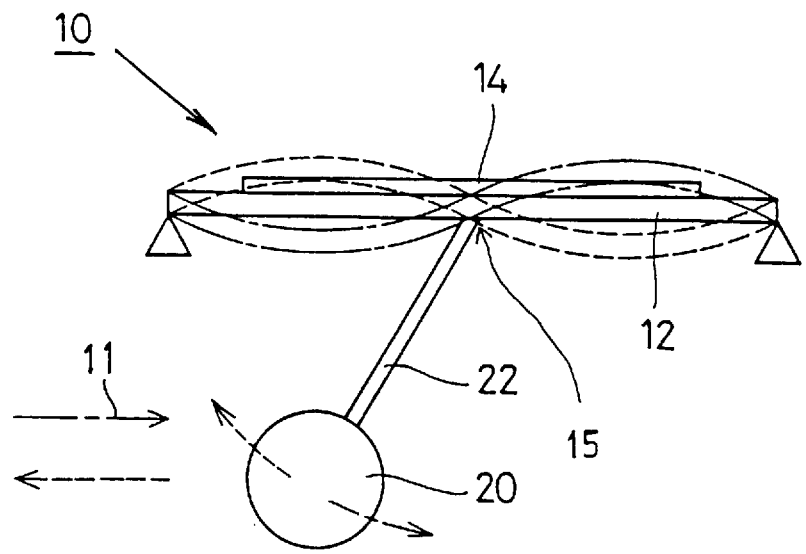
FIG. 3 is a diagram illustrating a state in which an impact parallel to a board is applied in the impact sensor shown in FIG. 1.

As a result of this structure, when an impact parallel to the plane of the board 12 is applied to the impact sensor 10, as shown by the arrows 11 in FIG. 3, the weight 20 is displaced so as to rotate relative to a connection point 15 where the connection member 22 is coupled to the board 12. Therefore, the respective sides of the board located on either side of an imaginary straight line passing through the connection point 15 (in this embodiment the imaginary line divides the board 12 in half) bend in opposite directions. More specifically, in the case where an impact is applied to the impact sensor 10 in the direction of arrows 11, the left side of the board 12 and the piezoelectric element 14 bend upward and the right side thereof bend downward. This results in generation of charges having opposite polarities at the left side and the right side of the piezoelectric element 14, respectively.

Since the area of the electrode 18a is smaller than the area of electrode 18b (because of its shape), electrode 18a detects less of the generated charge that electrode 18b does. Accordingly, although the same quantity of charges (but having opposite polarities) are generated at the left and right side of the piezoelectric element 14, the charges detected by the electrodes 18a and 18b are not completely canceled, and a net charge representing the difference between the detected charges is output. Therefore, the sensor 10 detects the fact that an impact has been applied to the impact sensor 10 by measuring the output voltage of the piezoelectric element 14.

Figure 4:
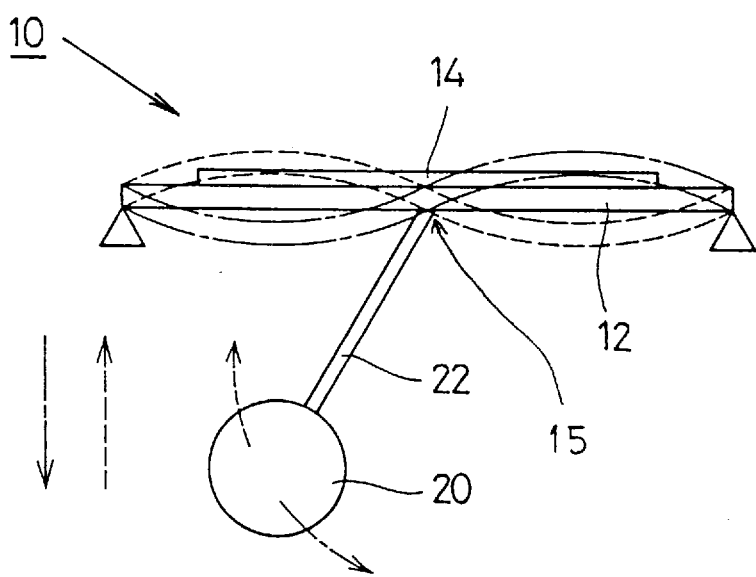
FIG. 4 is a diagram illustrating a state in which an impact intersecting at right angles to the board is applied in the impact sensor shown in FIG. 1.

Even when an impact is applied in a direction perpendicular to the plane of the board 12 (as shown in FIG. 4), the weight 20 is displaced so as to rotate relative to connection point 15. For this reason, the impact can be detected in the same way as when an impact parallel to the board 12 is applied to the sensor 10.

Because the weight 20 is connected to the board in such a manner that an imaginary line extending between the center of gravity of the weight 20 and the connection point 15, the board is deformed in substantially the same manner irrespective of the direction of the impact applied to the sensor 10 (move specifically, to the weight 20). Furthermore, since an impact from substantially any direction causes the weight 20 to rotate around the connection point 15, the degree of deformation of the board 12 will be almost the same with respect to impacts of about the same magnitude, irrespective of the direction of the impact. Therefore, it is possible to make the sensitivity of the impact sensor 10 to be substantially constant with respect to impacts from any direction.

As described above, the impact sensor 10 of the preferred embodiment of the present invention is a nondirectional sensor which is capable of detecting an impact in all the directions and which has almost constant sensitivity with respect to impacts in all directions. Therefore, if the impact sensor 10 is mounted in an automobile or the like (the mounting member is shown schematically in FIG. 1), it is possible to detect an impact of a car accident or the like.

Figure 5:
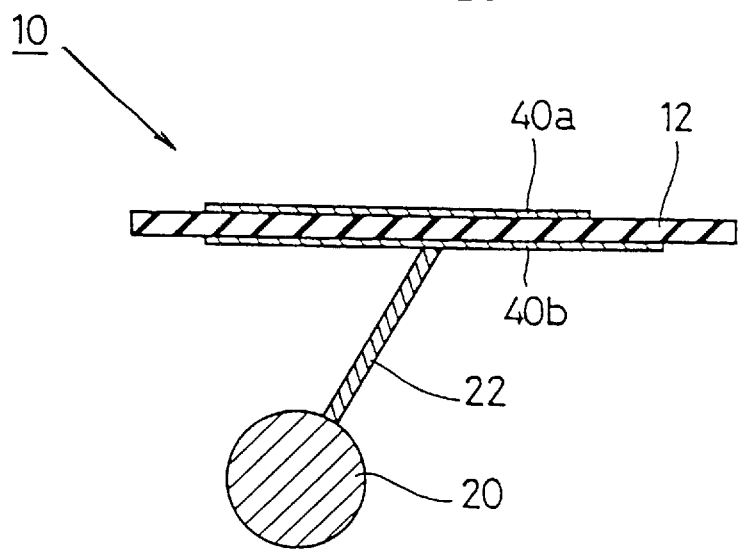
FIG. 5 is a sectional view illustrating another example of the impact sensor of the present invention.

To detect the impact, the piezoelectric element 14 may be excited, and the resonance frequency or impedance thereof may be measured. In this case, when the board 12 is deformed due to the application of the impact, the piezoelectric element 14 is also deformed, and the resonance frequency or impedance thereof varies. Therefore, it possible to detect the impact from the change in the resonance frequency or impedance of the output signal generated by the piezoelectric element 14. In an alternative embodiment shown in FIG. 5, the board 12 itself may be formed of a piezoelectric material having electrodes 40a and 40b formed on opposite sides of the board 12. In this embodiment, changes in the voltage, the resonance frequency or the impedance are detected by detecting the voltage across the electrodes 40a, 40b. Like the prior embodiment, an impact can be detected because the output voltage and the resonance frequency vary due to the deformation of the board 12.

Figure 6:
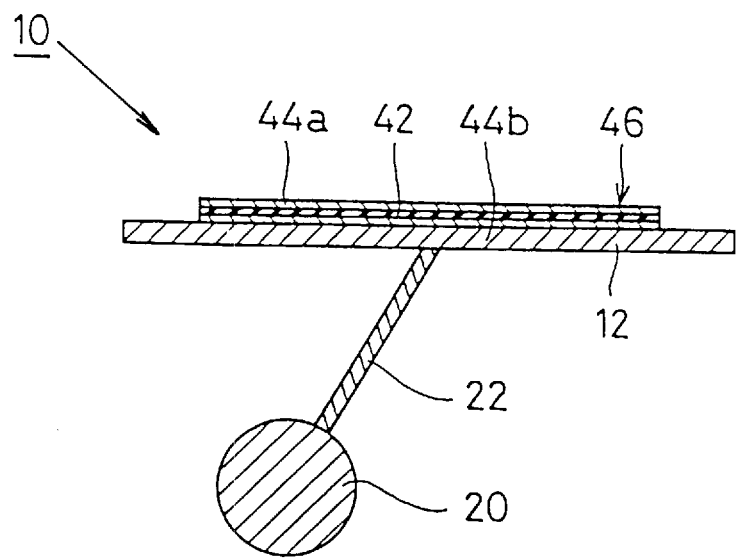
FIG. 6 is a sectional view illustrating yet another example of the impact sensor of the present invention.

In a third embodiment of the present invention (FIG. 6), a detector 46 having electrodes 44a and 44b formed on opposite sides of a ferroelectric thin film 42 is used. As the board 12 is deformed, the electrostatic capacity of the detector 46 varies. By measuring the electrostatic capacity of the detection element 46, it is possible to detect an impact applied to the sensor 10.

Figure 7:
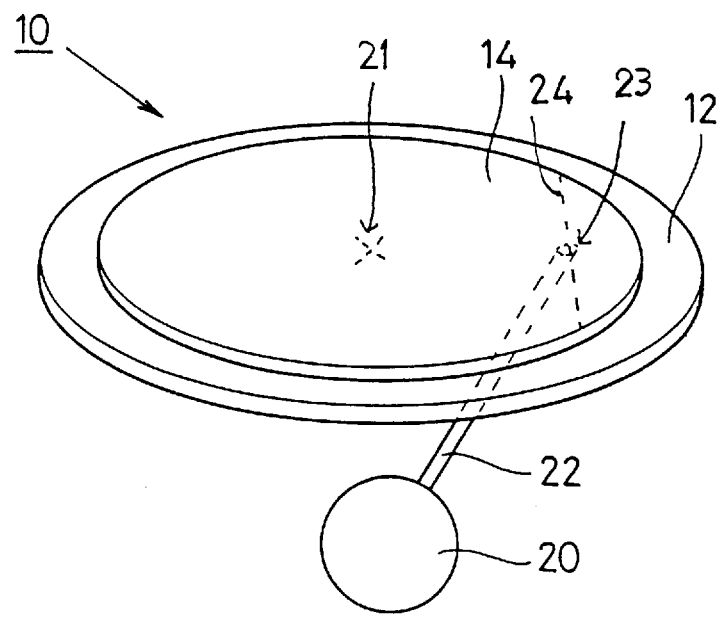
FIG. 7 is a perspective view illustrating another example of the impact sensor of the present invention.

In the foregoing embodiments, the connection member 22 is connected to the board 12 at the center of the board. Alternatively, as shown in FIG. 7, the connection member 22 may be mounted at a point 23 located remotely from the center 21 of the board 12. In this case, even if electrodes are formed on the entire surface of the opposite sides of the piezoelectric element 14, the electrode area on one side of an imaginary line (for example straight line 24) passing through its connection point 23 will be different than the electrode area on the other side of that line. In such an embodiment, it is not necessary to form one of the electrodes 18a of the piezoelectric element 14 into a special form.

Figure 8:
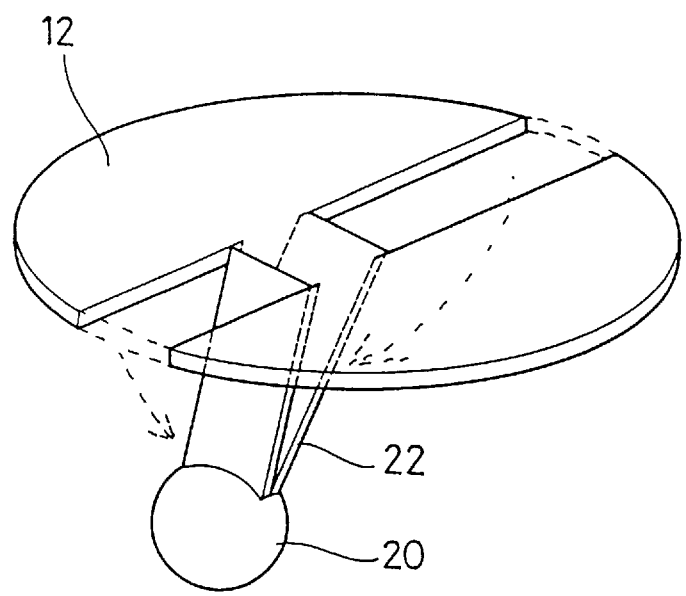
FIG. 8 is a perspective view illustrating modifications of the board and a connection member for use in the impact sensor of the present invention.

The connection member 22 can take substantially any shape and can be formed integrally with the board 12 as shown in FIG. 8. In this embodiment, the connection member 22 is formed from cutout portions in a part of the board 12, with those portions being bent and the weight 20 being mounted on the ends of the cutout portions. As in the prior embodiments, the connection member 22 connects the weight 20 to the board 12 in such a manner that an imaginary line extending between the center of gravity of the weight 20 and the effective connection point of the connection member 22 to the board 12 is oblique to the plane of the board 12. As described above, even if the board 12 and the connection member 22 are formed integrally, it is possible to obtain a nondirectional impact sensor 10 by obliquely forming the connection member 22 relative to the plane of the board 12.

The present invention may be embodied in other specific forms without departing from the spirit or essential attributes thereof and, accordingly, reference should be made to the appended claims, rather than to the foregoing specification, as indicating the scope of the invention.

What is claimed is:

1. An impact sensor, comprising:
    a board;
    a mass, coupled to the board by a connection member, for deforming the board when an impact is applied to the mass in any direction;
    a detector for detecting the deformation of the board, said detector being a piezoelectric device having electrodes formed on opposite sides of a piezoelectric layer, one of said electrodes being formed in such a way that its area is different on opposite sides of a straight line passing through the effective point at which said connection member is coupled to said board.

2. An impact sensor according to claim 1, wherein said detector is a detection device which uses a ferroelectric thin film.

3. An impact sensor according to claim 1, wherein said board is planar in shape and lies in a plane, said mass is coupled to said board by said connection member in such a manner that an imaginary straight line extending from the center of gravity of said mass to the effective point at which said connection member is coupled to said board extends obliquely to said plane.

4. An impact sensor according to claim 3, wherein said connection member is a straight member extending obliquely to said plane of said board.

5. An impact sensor according to claim 3, wherein said effective point at which said connection member is coupled to said board is in the center of said board.

6. An impact sensor, comprising:
    a board formed of a piezoelectric element;
    a mass, coupled to the board by a connection member, for deforming the board when an impact is applied to the mass in any direction;
    a pair of electrodes formed on opposite sides of said board and cooperating with said piezoelectric element to form a detector for detecting the deformation of said board, one of said electrodes being formed in such a way that its area is different on opposite sides of a straight line passing through the effective point at which said connection member is coupled to said board.

7. An impact sensor according to claim 6, wherein said effective point at which said connection member is coupled to said board is at a position away from the center of said board.

8. An impact sensor according to claim 6, wherein said board is planar in shape and lies in a plane, said mass is coupled to said board by said connection member in such a manner that an imaginary straight line extending from the center of gravity of said mass to the effective point at which said connection member is coupled to said board extends obliquely to said plane.

9. An impact sensor according to claim 8, wherein said connection member is a straight member extending obliquely to said plane of said board.

10. An impact sensor according to claim 9, wherein said effective point at which said connection member is coupled to said board is in the center of said board.

11. An impact sensor according to claim 6, wherein said effective point at which said connection member is coupled to said board is at a position away from the center of said board.

12. An impact sensor, comprising:
    a board;
    a mass coupled to the board for deforming the board when an impact is applied to the mass in any direction;
    a detector for detecting the deformation of the board, said detector being a piezoelectric device (having first and second electrodes formed on opposite sides of a piezoelectric layer) said electrodes being formed in such a way that the area of said first and second electrodes which oppose each other on one side of a straight line passing through the effective point at which said connection member is coupled to said board is different than the area that said first and second electrodes oppose each other on the other side of said straight line.

13. An impact sensor according to claim 12, wherein said board is planar in shape and lies in a plane, said mass is coupled to said board by a connection member in such a manner that an imaginary straight line extending from the center of gravity of said mass to the effective point at which said connection member is coupled to said board extends obliquely to said plane.

14. An impact sensor according to claim 13, wherein said connection member is a straight member extending obliquely to said plane.

15. An impact sensor according to claim 13, wherein said effective point at which said connection member is coupled to said board is in the center of said board.

16. An impact sensor according to claim 13, wherein said effective point at which said connection member is coupled to said board is at a position away from the center of said board.

17. An impact sensor, comprising:
    a board formed of a piezoelectric element;
    a mass, coupled to the board by a connection member, for deforming the board when an impact is applied to the mass in any direction;
    a pair of electrodes formed on opposite sides of said board and cooperating with said piezoelectric element to form a detector for detecting the deformation of said board, said electrodes being formed in such a way that the area of said first and second electrodes which oppose each other on one side of a straight line passing through the effective point at which said connection member is coupled to said board is different than the area that said first and second electrodes oppose each other on the other side of said straight line.

18. An impact sensor according to claim 17, wherein said board is planar in shape, said mass is coupled to said board by a connection member in such a manner that an imaginary straight line extending from the center of gravity of said mass to the effective point at which said connection member is coupled to said board extends obliquely to said of said board.

19. An impact sensor according to claim 18, wherein said connection member is a straight member extending obliquely to said plane of said board.

20. An impact sensor according to claim 19, wherein said effective point at which said connection member is coupled to said board is in the center of said board.

21. An impact sensor according to claim 20, wherein said effective point at which said connection member is coupled to said board is at a position away from the center of said board.

22. An impact sensor, comprising:
    a board;
    a support member for supporting said board;

a mass coupled to said board by a connection member for movement relative to both said board and said support member so that when an impact is applied to said impact sensor in substantially any direction, said mass is moved significantly more than said board and causes deformation of said board; and a detector for detecting deformation of said board, said detector being a piezoelectric device having electrodes formed on opposite sides of a piezoelectric layer, one of said electrodes being formed in such a way that its area is different on opposite sides of a straight line passing through the effective point at which said connection member is coupled to said board.

23. An impact sensor according to claim 22, wherein said board is planar in shape, said mass is coupled to said board by a connection member in such a manner that an imaginary straight line extending from the center of gravity of said mass to the effective point at which said connection member is coupled to said board extends obliquely to said of said board.

24. An impact sensor according to claim 23, wherein said connection member is a straight member extending obliquely to said plane of said board.

25. An impact sensor according to claim 23, wherein said effective point at which said connection member is coupled to said board is in the center of said board.

26. An impact sensor, comprising:

a board;

a support member for supporting said board;

a mass coupled to said for movement relative to both said board and said support member so that when an impact is applied to said impact sensor in substantially any direction, said mass is moved significantly more than said board and causes said deformation of said board; and a detector for detecting deformation of said board, said detector being a detection device which uses a ferro-electric thin film.

27. An impact sensor, comprising:

a board formed of a piezoelectric material;

a support member for supporting said board;

a mass coupled to said board by a connection member for movement relative to both said board and said support member so that when an impact is applied to said impact sensor in substantially any direction, said mass is moved significantly more than said board and causes deformation of said board; and a detector for detecting deformation of said board, said detector comprising a pair of electrodes formed on opposite sides of said board and cooperating with said piezoelectric material to define said detector, one of said electrodes being formed in such a way that its area is different on opposite sides of a straight line passing through the effective point at which said connection member is coupled to said board.

28. An impact sensor according to claim 27, wherein said effective point at which said connection member is coupled to said board is at a position away from the center of said board.

29. An impact sensor, comprising:

a board;

a mass coupled to said board by a connection member for deforming the board when an impact is applied to the mass in any direction, said mass deforming the board to substantially the same degree for a given impact force irrespective of the direction of the impact, said mass being coupled to said board by a connection member; and a detector for detecting the deformation of said board, said detector being a piezoelectric device having electrodes formed on opposite sides of a piezoelectric layer, one of said electrodes being formed in such a way that its area is different on opposite sides of a straight line passing through the effective point at which said connection member is coupled to said board.

30. An impact sensor, comprising:

a board;

a mass for deforming the board when an impact is applied to said mass in any direction, said mass deforming said board to substantially the same degree for a given impact force irrespective of the direction of said impact; and a detector for detecting said deformation of said board, said detector being a detection device which uses a ferro-electric thin film.

31. An impact sensor, comprising:

a board;

a mass for deforming said board when an impact is applied to said mass in any direction, said mass being coupled to said board by a connection member; and a detector for detecting deformation of said board; said board, said mass and said detector cooperating in such a manner that said impact sensor has substantially the same sensitivity to a given impact force irrespective of the direction of said impact, said detector being a piezoelectric device having electrodes formed on opposite sides of a piezoelectric layer, and one of said electrodes being formed in such a way that its area is different on opposite sides of a straight line passing through the effective point at which said connection member is coupled to said board.

32. An impact sensor according to claim 31, wherein said board is planar in shape, said mass is coupled to said board by a connection member in such a manner that an imaginary straight line extending from the center of gravity of said mass to the effective point at which said connection member is coupled to said board extends obliquely to said of said board.

33. An impact sensor, comprising:

a board formed of a piezoelectric material;

a mass coupled to said board by a connection member for deforming said board when an impact is applied to said mass in any direction, said mass deforming said board to substantially the same degree for a given impact force irrespective of the direction of said impact; and a detector for detecting said deformation of said board, said detector comprising a pair of electrodes formed on opposite sides of said board and cooperating with said board to define said detector.

34. An impact sensor according to claim 33, wherein said effective point at which said connection member is coupled to said board is at a position away from the center of said board.

35. An impact sensor, comprising:

a board formed of a piezoelectric material;

a mass for deforming said board when an impact is applied to said mass in any direction; and a detector for detecting said deformation of said board; said board, said mass and said detector cooperating in such a manner that said impact sensor has substantially the same sensitivity to a given force irrespective to the direction of said impact; said detector being a detection device which uses a ferro-electric thin film.

36. An impact sensor according to claim 35, wherein said effective point at which said connection member is coupled to said board is at a position away from the center of said board.

37. An impact sensor, comprising:

a board formed of a piezoelectric material;

a mass for deforming said board when an impact is applied to said mass in any direction, said mass being coupled to said board by a connection member; and a detector for detecting deformation of said board; said detector comprising a pair of electrodes formed on opposite sides of said board and cooperating with said piezoelectric material to define said detector; one of said electrodes being formed in such a way that its area is different on opposite sides of a straight line passing through the effective point at which said connection member is coupled to said board.

38. An impact sensor according to claim 37, wherein said connection member is a straight member extending obliquely to said plane of said board.

39. An impact sensor according to claim 37, wherein said effective point at which said connection member is coupled to said board is in the center of said board.

40. An impact sensor, comprising:

a board having a planar shape and lying in a plane;

a mass, coupled to the board by a connection member, for deforming the board when an impact is applied to the mass in any direction, said connection member being coupled to said board in such a manner that an imaginary line extending from the center of gravity of said mass to the effective point at which said connection member is coupled to said board extends obliquely to said plane; and a detector for detecting deformation of said board.

41. An impact sensor according to claim 40, wherein said detector is a detection device which uses a ferro-electric thin film.

42. An impact sensor according to claim 40, wherein said detector is a piezoelectric device having electrodes formed on opposite sides of a piezoelectric layer, and one of said electrodes is formed in such a way that its area is different on opposite sides of a straight line passing through the effective point at which said connection member is coupled to said board.

43. An impact sensor according to claim 40, wherein said board is formed of a piezoelectric material and wherein said piezoelectric material cooperates with a pair of electrodes formed on opposite sides of said board, and one of said electrodes is formed in such a way that its area is different on opposite sides of a straight line passing through the effective point at which said connection member is coupled to said board.

44. An impact sensor according to claim 40, wherein said effective point at which said connection member is coupled to said board is at a position away from the center of said board.

45. An impact sensor according to claim 40, wherein said effective point at which said connection member is coupled to said board is in the center of said board.

46. An impact sensor according to claim 29, wherein said board is planar in shape, said mass is coupled to said board by a connection member in such a manner that an imaginary straight line extending from the center of gravity of said mass to the effective point at which said connection member is coupled to said board extends obliquely to said of said board.

47. An impact sensor according to claim 46, wherein said connection member is a straight member extending obliquely to said plane of said board.

48. An impact sensor according to claim 46, wherein said effective point at which said connection member is coupled to said board is in the center of said board.

* * * * *